Jan. 3, 1956

B. F. WILEY 2,729,101

FLOWMETER

Filed July 9, 1951

INVENTOR.
B. F. WILEY

BY *Hudson & Young*

ATTORNEYS

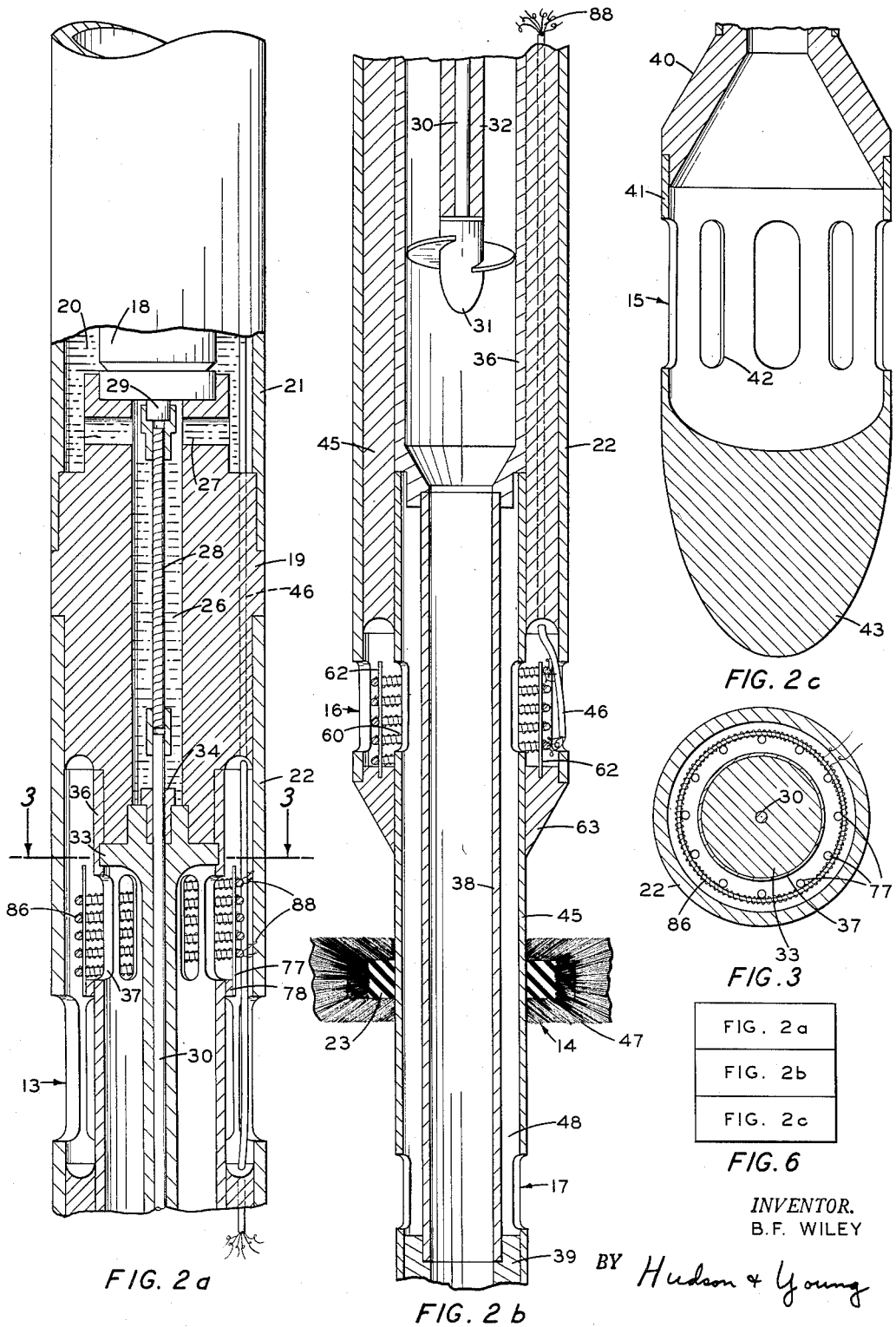

United States Patent Office 2,729,101
Patented Jan. 3, 1956

2,729,101

FLOWMETER

Bruce F. Wiley, Bartlesville, Okla., assignor to Phillips Petroleum Company, a corporation of Delaware Application July 9, 1951, Serial No. 235,770

4 Claims. (Cl. 73—155)

This invention relates to flowmeters. In another aspect it relates to apparatus for measuring fluid flow rates in bore holes. In another aspect it relates to apparatus for determining the rate of fluid injection in a well. In still another aspect it relates to electrical circuitry for operating flowmeters within bore holes.

In certain petroleum operations it has been found desirable to inject fluids through a bore hole into adjacent earth formations. This is particularly true in water flooding operations in which water is pumped into a given bore hole under pressure, from which it enters the surrounding formations. It is of course desirable to have a measurement of the rate of fluid injection into the formations; and in order to provide such a measurement it has been proposed to position a flowmeter within the bore hole. Such a meter can be moved from point to point within the bore hole to indicate the total flow therepast at different depths. In addition to providing a meter which alters the flow characteristics as little as possible, any apparatus positioned within a bore hole must be relatively simple and employ a minimum number of conducting cables to connect said apparatus with surface equipment. Most of the flowmeters known in the prior art do not adequately meet these requirements. In accordance with the present invention, however, there has been provided a simplified flowmeter which makes use of a simple Wheatstone bridge having a pair of opposing resistance arms which are independently heated to create an unbalanced condition in the bridge circuit. The cooling effect of liquid flow past these heated arms in a first flow path thereby tends to reduce the unbalance of the circuit so as to indicate the rate of flow through said first path. A second path is provided with a motor driven impeller for measuring fluid flow therethrough. The bridge circuit, together with an electrical motor for driving the water flow impeller, is connected to surface equipment adjacent the bore hole through a minimum number of electrical leads.

It is accordingly an object of this invention to provide apparatus for accurately measuring fluid flow.

Another object is to provide apparatus for determining at the surface of a bore hole the rate of fluid flow from within the bore hole into formations surrounding said bore hole.

It is a further object of this invention to provide a bore hole flowmeter in which the electrical connections between the surface equipment and the bore hole equipment require a minimum of electrical conductors.

A still further object is to provide apparatus for carrying out the above-mentioned objects which is simple to construct, easy to operate, and capable of giving accurate readings.

Various other objects, advantages and features of this invention should become apparent from the following detailed description taken in conjunction with the accompanying drawing in which:

Figure 1 illustrates water injection pumping and metering apparatus positioned within a bore hole;

Figures 2a, 2b, and 2c, collectively, are vertical sectional views taken along line 2—2 in Figure 1;

Figure 3 is a sectional view taken along line 3—3 in Figure 2a;

Figure 6 illustrates the arrangement of parts of Figures 2a, 2b, and 2c.

Figure 1:
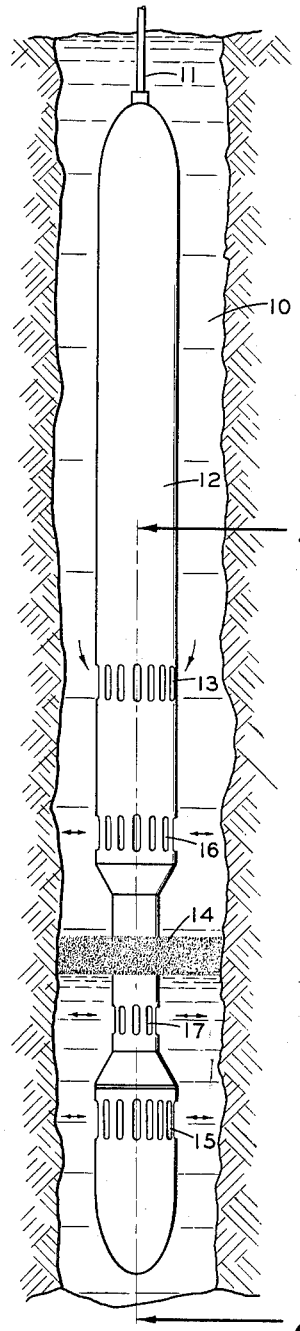

Suitable metering apparatus for use in water injection operations is illustrated in Figure 1 of the drawing. This apparatus, which is in the form of an elongated casing, is supported within a section of a bore hole 10 by means of a cable 11, includes a motor-pump assembly 12 serving to measure fluid such as water which flows from an inlet 13 positioned above a packing device 14 to an outlet 15 below said packing device 14. A second by-pass flow path is provided by means of an interior passage which communicates with an opening 16 positioned above packing device 14 and an opening 17 positioned below said packing device, this passage having a flowmeter constructed in accordance with the present invention associated therewith to indicate the flow of liquid therethrough. When water flows through outlet 15 at a rate equal to the rate at which it enters the adjacent formation below packer 14 there is no flow in either direction through openings 16 and 17 or through the flowmeter associated with the passage connecting these outlets; that is, the flowmeter reading indicates that water is being pumped into the formation at an optimum rate.

The detailed construction of the metering apparatus is shown in Figures 2a, 2b, and 2c. Motor-pump assembly 12 includes a motor 18 positioned at the upper end of annular block 19, motor 18 being operated from a source of electrical energy located at the surface of the bore hole through suitable leads, not shown, carried by cable 11. Chamber 20 preferably is filled with an insulating liquid such as oil.

A passage 26 in annular member 19 communicates with chamber 20 through openings 27 in member 19. Passage 26 contains a flexible rod coupling 28 which connects the drive shaft 29 of motor 18 to an impeller rod 30 which carries a pump impeller 31. Rod 30 is maintained within a sleeve 32 having a integral flanged head 33 abutting annular member 19 and carrying a bearing 34 for impeller rod 30. The impeller 31 is housed within a tube 36 which is secured to annular member 19 with its upper end, and which is provided with openings 37 making up a portion of inlet 13. The lower end of tube 36 is joined to a smaller tube 38, which in turn is connected to a tubular member 39 having a flared lower portion 40 which receives an enlarged cylindrical discharge unit 41. Unit 41 is provided with openings 42 defining the outlet 15; said unit 41 also has an integral weight portion 43 tending to properly orient the apparatus in the bore hole. Mounted concentrically with tube 38 is a larger tube 45 carrying a packing device 14 which may be of any desired construction, but preferably is formed of an annular sleeve 23 of hard rubber carrying a set of radially extending bristles 47 extending outwardly to engage the walls of the bore hole, these bristles 47 being impregnated with a suitable sealing compound such as grease.

The above-described metering apparatus is of substantially the same form as the flow meter described and claimed in the copending application of R. G. Piety, Serial No. 159,264, filed May 1, 1950, entitled Flowmeter. The present invention, however, resides not in this metering apparatus, but rather a particular form of flow indicating means adapted to measure the flow through a passage 48 which communicates with openings 16 and 17 as previously described.

Figure 4:
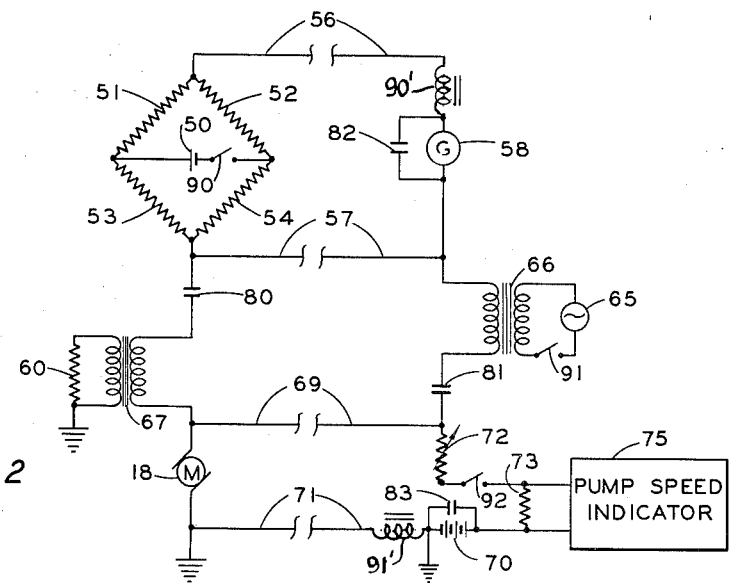
Figure 4 is a schematic electrical circuit diagram of the flowmeter positioned within the pumping and metering apparatus in Figures 1, 2a, 2b, and 2c.

The various circuit elements of the flowmeter of the present invention are illustrated schematically in Figure 4. Those units to the left of the broken line are positioned in the pumping apparatus located within the bore hole, while those elements to the right of the broken line are positioned at the surface.

Figure 5:
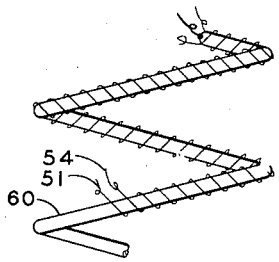
Figure 5 is a detailed view of the bridge resistance arms and heater element of the flowmeter.

The flowmeter consists essentially of a Wheatstone-type bridge unit in which a voltage source 50 is applied across opposite terminals of resistance arms 51, 52, 53, and 54, making up the bridge. Electrical leads 56 and 57 connect opposite terminals of the bridge circuit to a current indicating device such as galvanometer 58 positioned at the surface of the bore hole. A pair of opposing resistance arms such as 51 and 54 are positioned adjacent one another and also adjacent heating element 60 as is more clearly illustrated in Figure 5. Resistance elements 51 and 54 which have a minimum amount of electrical insulation are wound together around heating element 60, which in turn is formed in a helix and mounted adjacent opening 16 of the pumping device on a plurality of spaced support rods 62, which in turn are secured to an annular member 63 positioned between cylindrical member 45 and casing 22.

Electrical energy for heating element 60 is supplied by means of voltage source 65 which is transmitted through transformers 66 and 67 and electrical leads 57 and 69 to element 60 positioned at the bottom of the bore hole. It should be noted that lead 57 is common to both the heating circuit and the bridge detecting circuit. Motor 18 which serves to drive impeller 31 is supplied by a source of direct current voltage 70 positioned at the surface and connected to motor 18 by leads 69 and 71. It should likewise be noted that lead 69 is common to the heating circuit previously mentioned. A variable resistor 72 is connected in series with voltage source 70, said resistor serving to vary the speed of motor 18. A second resistor 73 also is connected in the motor circuit, and motor speed indicating means 75 is coupled thereto. Motor speed indicating means 75 can consist of one of several speed indicators known to those skilled in the art. For example, the output of a variable frequency oscillator can be applied across an oscilloscope together with the voltage drop taken across resistor 73. In this manner the frequency of the commutator ripple of direct current motor 18 is compared with a known frequency of the oscillator, this oscillator frequency being varied until the two frequencies are equal as indicated by the resulting Lissajou figure on the oscilloscope. A second pump speed indicator could take the form of a wattmeter connected in the motor circuit to measure the electrical energy supplied motor 18, thereby giving an indication of the water passing impeller 31.

It should be apparent that the circuit illustrated in Figure 4 readily accomplishes one of the objects of this invention, namely, the reduction of connecting leads traversing the bore hole. The three independent circuits, namely, the bridge circuit, the heating circuit, and the motor circuit, are connected through the bore hole by means of four electrical leads. To prevent interaction between these circuits suitable filtering means such as capacitors 80 and 81 are provided to separate the direct current circuits. Any alternating current which may enter the bridge circuit is shunted about galvanometer 58 by a third capacitor 82; and any alternating current signal, such as the commutator ripple of motor 18 is shunted about voltage source 70 by a fourth capacitor 83. Suitable choke coils 90' and 91' can be added to the direct current circuits if further filtering is required. Switches such as 90, 91, and 92 are provided in the bridge circuit, heating circuit, and motor circuit, respectively, to enable said circuits to be opened when not in operation. Electrical cables adapted for suspending metering apparatus within a bore hole are readily available containing three insulated electrical leads positioned within a metallic sheath. These three insulated leads can be leads 56, 57, and 69 of Figure 4 while the metallic sheath serves as lead 71. This sheath preferably is grounded as illustrated.

Bridge resistors 51 and 54 which are wound around heating element 60 are positioned within the pumping apparatus illustrated in Figure 2b as previously described. The second opposing bridge resistors 52 and 53 are positioned adjacent inlet 13 as shown in Figure 2a. For convenience of balancing the resulting bridge circuit it is desirable that resistors 52 and 53 have ohmic values essentially equal to those of resistors 51 and 54. To provide symmetry of construction resistors 52 and 53 can be coiled about and electrically insulated from a suitable support wire 86 similar to heating element 60. Wire 86 is mounted about a plurality of rods 77 secured to annular member 78. This structure is illustrated in greater detail in Figure 3 which represents a vertical sectional view taken along line 3—3 in Figure 2a. Voltage source 50, transformer 67, and capacitor 80 are positioned in a suitable housing, not shown, located above motor 18 within motor-pump assembly 12. Various connecting leads, such as 88, required to connect the bridge resistance arms 51, 52, 53, and 54 and heating element 60 in circuit arrangement pass from the housing in assembly 12 to the respective flowmeter elements through a suitable conduit 46 in block 19 and tube 45.

It should now be apparent that operation of motor 18 rotates impeller 31 which is positioned within the path from inlet 13 through tubes 36, 38, and 39 to the discharge openings 42 of outlet 15. In this regard it should be noted that the flow through the foregoing path is created by the pressure on the fluid in region 10, which is established by suitable pumping apparatus (not shown) positioned at the surface of the bore hole, rather than by operation of impeller 31. Impeller 31 is rotated with the flow of water therepast merely for the purpose of giving an indication of the rate water is being passed. The second flow path is provided through inlet 16 past bridge resistors 51 and 54, thence through opening 48, and out opening 17, or in the reverse direction. Under conditions of zero flow through this second flow path the unbalance of the bridge circuit will be at a maximum due to the heating effect of element 60 on resistors 51 and 54. As the flow past resistors 51 and 54 increases, these resistors will be cooled thereby giving an indication of the rate of fluid flow therepast. Resistors 52 and 53, which are positioned within the path of flow created by impeller 31, are maintained at substantially a constant reference temperature. When water flows past impeller 31 at an optimum rate, the flow through the by-pass channel 48 will be zero as indicated by maximum unbalance of the bridge circuit. At this position the speed of motor 18 is determined, and by knowing the water flowing past impeller 31 as a function of the speed of motor 18, the amount of water being pumped into the adjacent formations becomes apparent.

While the flowmeter of the present invention has been described in connection with a particular pumping apparatus for use in water injection operations, it should be apparent that the invention is by no means limited to such an application. For example, the rate of flow through any two parallel flow paths can be compared, or the single flow through one path can be measured by this flowmeter. Even though both resistors 51 and 54 are heated in the present illustrated embodiment, it should be obvious that satisfactory operation can be obtained by heating only one of the resistance arms. The particular form of heating element is not restricted to an electrical element but rather can be any device capable of producing a constant or known quantity of heat.

While this invention has been described in connection with a present preferred embodiment thereof, it is to be understood that this description is illustrative only and is not intended to limit my invention further than the scope of the claims allowed herein.

Having described my invention, I claim:

1. Apparatus for measuring fluid flow between isolated regions of a bore hole comprising, in combination, a casing adapted to be disposed in a bore hole, a packer attached to said casing and extending outwardly therefrom to engage the walls of the bore hole in fluid-tight engagement, first conduit means extending through said casing to communicate with regions of the bore hole above and below said packer, second conduit means extending through said casing to communicate with regions of the bore hole above and below said packer, a direct current Wheatstone bridge circuit having a first pair of thermal sensitive opposing resistance arms disposed within said first conduit means in thermal contact with the flow therethrough, a heating element to heat said first pair of resistance arms, an impeller disposed within said second conduit means, and a direct current motor to drive said impeller; a direct current voltage source to energize said motor, an alternating current voltage source to energize said heating element, current indicating means to measure electrical unbalance of said bridge circuit, and means to measure the speed of rotation of said impeller, said voltage sources and indicating means being adapted to be positioned at the surface of a bore hole; and a first pair of leads connecting said bridge circuit with said current indicating means, a second pair of leads connecting said motor with said direct current voltage source, one of said first pair of leads and one of said second pair of leads connecting said heating element with said alternating current voltage source, and a pair of capacitors connected in the circuit of said heating element and said alternating current voltage source to prevent interaction between the alternating current flow in the bridge and motor circuits extending between a region within a bore hole and the surface of the bore hole.

2. Apparatus for measuring the rate of fluid flow through a passage comprising a structure adapted to be positioned within the passage, packing means extending outwardly from said structure to engage the walls of the passage to divide the passage into first and second regions, first conduit means carried by said structure to communicate between said first and second regions, second conduit means carried by said structure to communicate between said first and second regions, a Wheatstone bridge circuit having at least two thermal sensitive impedance elements disposed in adjacent arms thereof, one of said elements being disposed in said first conduit means and the other of said elements being disposed external of said first conduit means in thermal contact with fluid in the passage, a heating element adjacent said one impedance element, current indicating means to measure electrical unbalance of said bridge circuit, said unbalance being representative of fluid flow through said first conduit means, an impeller positioned in said second conduit means, a motor to rotate said impeller to direct fluid flow through said second conduit means, and means to measure the speed of rotation of said impeller, the speed of rotation of said impeller being a measure of the rate of fluid flow through said second conduit means when the indicated flow through said first conduit means is zero.

3. The combination in accordance with claim 2 wherein said Wheatstone bridge circuit contains a second thermal sensitive impedance element in the arm thereof opposite said first-mentioned impedance element, said second impedance element also being positioned in said first conduit means adjacent said heating element.

4. Apparatus for measuring fluid flow between isolated regions of a bore hole comprising, in combination, a casing adapted to be disposed in a bore hole, a packer attached to said casing and extending outwardly therefrom to engage the walls of the bore hole in fluid-tight engagement, first conduit means extending through said casing to communicate with regions of the bore hole above and below said packer, said conduit means extending through said casing to communicate with regions of the bore hole above and below said packer, a Wheatstone bridge circuit, at least one arm of which contains a thermal sensitive resistance element disposed in said first conduit means, an electrical heating element adjacent said one arm in thermal contact therewith, a flow measuring impeller disposed in said second conduit means, and a motor connected to said impeller; a first voltage source to energize said motor, a second voltage source to energize said heating element, current indicating means to measure electrical unbalance of said bridge circuit, said unbalance being a function of flow through said first conduit means, and means to measure the speed of rotation of said impeller, the speed of rotation of said impeller being representative of flow through said second conduit means when the indicated flow through said first conduit means is zero, said voltage sources and indicating means being positioned at a region spaced from said conduit means; and a first pair of leads connecting said bridge circuit with said current indicating means, a second pair of leads connecting said motor with said first voltage source, one of said first pair of leads and one of said second pair of leads connecting said heating element with said second voltage source, and electrical filter means to prevent interaction between the three individual circuits extending between said conduit means and said region spaced from said conduit means.

References Cited in the file of this patent

UNITED STATES PATENTS

| | | |
|---|---|---|
| 155,280 | Ball et al. | Sept. 22, 1874 |
| 1,691,600 | Brush Jr. et al. | Nov. 13, 1928 |
| 1,826,762 | Franklin | Oct. 13, 1931 |
| 1,902,427 | Sawyer | Mar. 21, 1933 |
| 2,297,435 | Schwager | Sept. 29, 1942 |
| 2,340,987 | Robidoux | Feb. 8, 1944 |
| 2,377,884 | Hillman | June 12, 1945 |
| 2,612,047 | Nilsson et al. | Sept. 30, 1952 |

FOREIGN PATENTS

| | | |
|---|---|---|
| 25,923 | Great Britain | 1913 |
| 112,741 | Australia | Mar. 17, 1941 |